United States Patent
Fu et al.

(10) Patent No.: US 8,621,481 B2
(45) Date of Patent: Dec. 31, 2013

(54) APPARATUS AND METHOD FOR PERFORMING A REBALANCE OF RESOURCES FOR ONE OR MORE DEVICES AT BOOT TIME

(75) Inventors: Zhijun Robin Fu, Beijing (CN); Yong Colin Zou, Beijing (CN); Wesley W. Shao, Union City, CA (US)

(73) Assignee: Oracle International Corporation, Redwood City, CA (US)

( * ) Notice: Subject to any disclaimer, the term of this patent is extended or adjusted under 35 U.S.C. 154(b) by 217 days.

(21) Appl. No.: 13/158,669

(22) Filed: Jun. 13, 2011

(65) Prior Publication Data
US 2012/0317407 A1  Dec. 13, 2012

(51) Int. Cl.
G06F 9/46 (2006.01)
G06F 15/173 (2006.01)

(52) U.S. Cl.
USPC ........... 718/105; 718/104; 709/223; 709/224; 709/225; 709/226

(58) Field of Classification Search
None
See application file for complete search history.

(56) References Cited

U.S. PATENT DOCUMENTS

| | | | |
|---|---|---|---|
| 6,421,755 B1 | 7/2002 | Rao | |
| 6,446,126 B1 * | 9/2002 | Huang et al. | 709/226 |
| 6,697,901 B1 * | 2/2004 | Shun Chan | 710/200 |
| 6,725,456 B1 * | 4/2004 | Bruno et al. | 718/102 |
| 6,963,947 B2 | 11/2005 | Piatetsky et al. | |
| 7,810,098 B2 * | 10/2010 | Barillari et al. | 718/104 |
| 7,826,365 B2 * | 11/2010 | Tang et al. | 370/235 |
| 8,020,034 B1 * | 9/2011 | Shrivastava et al. | 714/4.11 |
| 8,060,883 B1 * | 11/2011 | Rao et al. | 718/104 |
| 2002/0156945 A1 | 10/2002 | Takada | |
| 2003/0135615 A1 * | 7/2003 | Wyatt | 709/225 |
| 2005/0076104 A1 * | 4/2005 | Liskov et al. | 709/223 |
| 2005/0216585 A1 * | 9/2005 | Todorova et al. | 709/224 |
| 2007/0088943 A1 | 4/2007 | Phelps et al. | |
| 2007/0233928 A1 | 10/2007 | Gough | |
| 2007/0255798 A1 * | 11/2007 | Schneider | 709/217 |
| 2008/0215755 A1 * | 9/2008 | Farber et al. | 709/245 |
| 2009/0064159 A1 * | 3/2009 | LaFrese et al. | 718/104 |
| 2009/0300181 A1 * | 12/2009 | Marques | 709/226 |
| 2010/0042727 A1 * | 2/2010 | White | 709/226 |
| 2010/0125653 A1 * | 5/2010 | Cherian et al. | 709/223 |
| 2011/0010478 A1 | 1/2011 | Zou et al. | |

FOREIGN PATENT DOCUMENTS

WO  0144935 A1  6/2001

* cited by examiner

Primary Examiner — Emerson Puente
Assistant Examiner — Adam Lee
(74) Attorney, Agent, or Firm — Brooks Kushman P.C.

(57) ABSTRACT

An apparatus and a method for performing a resource rebalance during a boot operation of a computer is provided. The apparatus includes a resource manager that is coupled to a plurality of devices. The resource manager is configured to receive a signal indicative of a desired set of requested resources from each of the plurality of devices and to determine that a first child device requires more resources than an amount previously assigned thereto. The resource manager is configured to locate a lowest common parent device to the first child device, which forms a lowest common subtree and to determine a resource range and to calculate a resource requirement request for the lowest common subtree. The resource manager is further configured to compare the resource requirement to the resource range to determine if a first range of resources is adequate to satisfy a second range of requested resources.

15 Claims, 4 Drawing Sheets

APPARATUS AND METHOD FOR PERFORMING A REBALANCE OF RESOURCES FOR ONE OR MORE DEVICES AT BOOT TIME

TECHNICAL FIELD

Embodiments of the present disclosure generally relate to an apparatus and method for performing a rebalance of resources for one or more devices at boot time.

BACKGROUND

Peripheral Component Interconnect (PCI) or PCI express (PCIe) based devices generally depend on resources that are properly assigned thereto in order to properly work. These resources include PCI bus numbers, PCI input/output (I/O), memory addresses and interrupts. In general, after a computer system is powered on, firmware (e.g., basic input/output system (BIOS) for x86, Open Boot Program (OBP) for Scalable Processor Architecture (SPARC)) probes the devices and assigns resources thereto. Once the resources are assigned to the devices, an operating system (OS) such as Solaris does not change the resource assignments thereafter.

Certain newer or modern devices may require more resources than what the firmware allocates. For example, Single Root I/O Virtualization (SR-IOV) based devices as defined by the Peripheral Component Interconnect-Special Interest Group (PCI-SIG) generally require more PCI memory resources for Virtual Functions (VFs). In another example, Alternative Routing-ID Interpretation (ARI) based devices as defined by PCI-SIG may require additional PCI bus numbers in order to operate.

In general, most firmware on the market today has been designed prior to the advent of various PCI standards. As such, the firmware may not recognize the desired requirements for PCI devices and may not adequately reserve resources for these devices. To support modern devices (i.e., devices which conform to the PCI based specifications), Solaris may move resources around, after firmware has completed a resource allocation (i.e., after the computer system is booted).

Resource rebalance is generally defined as the operating system changing some of the devices' previously assigned resources to provide available resources for new devices or new requirements for previously existing devices. One example of a resource rebalance implementation is set forth in co-pending U.S. patent application Ser. No. 12/501,817 ("the '817 application) filed on Jul. 13, 2009. The '817 application discloses, among other things, that a rebalance operation may occur when a device is hot-plugged into the computer system.

SUMMARY

In at least one embodiment, an apparatus and a method for performing a resource rebalance during a boot operation of a computer is provided. The apparatus comprises a resource manager for being operably coupled to a plurality of devices in a device tree. The resource manager is configured to receive at least one signal indicative of a desired set of requested resources from each of the plurality of devices to enable the plurality of devices to operate in an intended manner and to determine that at least one first child device of the plurality of devices requires more resources than an amount previously assigned thereto. The resource manager is further configured to locate a lowest common parent device to the at least one first child device. The lowest common parent device and the at least one first child device forms a lowest common subtree. The resource manager is further configured to determine a resource range corresponding to a first range of resources that are made available to the lowest common subtree. The resource manager is further configured to calculate a resource requirement corresponding to a second range of requested resources that includes at least one of a non-relocatable resource request and a relocatable resource request for the lowest common subtree. The resource manager is further configured to compare the resource requirement to the resource range to determine if the first range of resources is adequate to satisfy the second range of resources.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

Figure 1:
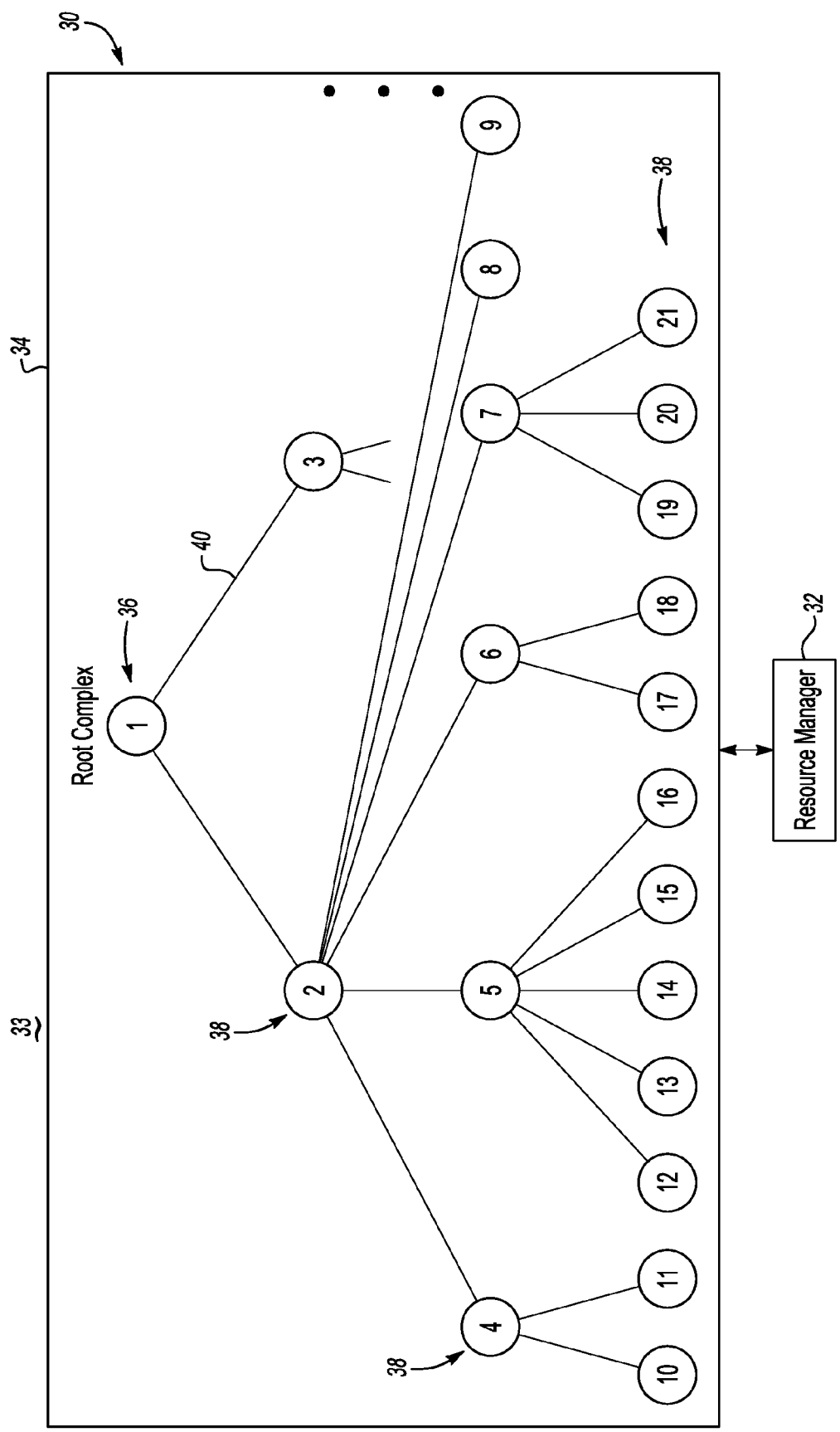
FIG. 1 depicts an apparatus for rebalancing resources during computer boot-up in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments set forth generally includes a resource manager that is operably coupled to a plurality of devices in a device tree within a computer. It is recognized that any one or more of the devices in the device tree requires various resources in order to operate in an intended manner. During computer boot up the desired resource may be assigned to the various devices. However, some of the devices may require additional resources than those assigned thereto. The resource manager determines which device(s) require such additional resources and locates a lowest common parent device to the device(s) that require the additional resources. The devices under the lowest common parent device are generally defined as at least one child device. The lowest common parent device and the at least one child device form a lowest common subtree. The resource manager determines a resource range for the lowest common subtree. The resource range is generally defined as a list of resources that are made available to the lowest common subtree. The resource manager may compare and merge various relocatable resource requests and/or fixed resource requests as requested by the at least one child device and/or the lowest common parent device to generate a resource requirement for the lowest common subtree.

The resource manager compares the resource range to the resource requirement for the lowest common subtree to determine if the resource range includes an adequate amount of resources that can be assigned to lowest common subtree as indicated in the resource requirement. If the resource range includes an adequate amount of resources that can be assigned to the lowest common subtree (e.g., the resource requirement (or range of requested addresses) for the lowest common subtree is capable of being fit into the range of addresses as indicated in the resource range), then a rebalance operation may occur during computer boot up in the manner indicated in the resource requirement. If the resource range does not include an adequate number of resources that can be assigned to the lowest common subtree, then the resource manager locates the next lowest common parent device and the process starts over.

Generally, for Solaris, the system boot process may be sequenced in stages. After firmware has probed all IO devices and assigned resources for the same (e.g., by programming hardware for the devices), an OS boot code may read the IO devices and configure space to retrieve address ranges that are occupied for each device. When the OS attaches drivers for all IO device drivers, the OS may initialize IO device hardware so that the devices are ready for use.

For SR-IOV devices, the OS may need to properly configure VFs before drivers for these VFs can be attached. The configuration may include allocating resources, setting up device properties, programming hardware for the SR-IOV based devices, and any other operations contemplated by a system administrator. In general, conventional firmware may not reserve enough resources for the VFs. As such, resource allocation may fail and VF drivers may not be properly attached to the devices. To overcome this case, adequate resources for these devices may need to be reserved during computer system boot up and prior to the OS attempting to attach drivers as all setups (or configurations) for the VFs may be completed or performed as part of the boot process.

In general, runtime rebalance (e.g., a rebalance operation that is performed after computer boot up) may require that device drivers in the computer system support a suspend and resume operation to tolerate hardware reconfiguration between suspend and resume. Various resources such as, but not limited to, bus numbers, and Base Address Registers (BAR) may have been changed by a rebalance operation. Drivers may need to tear down previous memory mappings and other configurations and reconfigure these mappings according to a latest setting. If any device does not have the proper amount or resources, then the entire rebalance operation may fail.

In a boot rebalance operation as noted in connection with the embodiments of the present invention, resources may be shuffled during a boot operation (e.g., before drivers are attached). In general, the boot rebalance operation may rebalance resources before drivers are attached thereby eliminating the need to perform a suspend and resume since the resource rebalance may occur early in the boot process. In addition, driver support may not be needed thus providing an increased chance to succeed when a rebalance is performed during a boot rebalance operation. In addition, in order to overcome expensive runtime rebalance operations, resources reservations for hot-pluggable devices (or slots) may be reasonably rearranged during the boot operation so that runtime rebalance requests that may occur during hot-plug operations may be reduced.

The runtime rebalance for a hot-plug device may be done one at a time since hot-plug operations may be initiated by administrators one at a time. During a runtime rebalance operation, all devices within the impacted subtree may be divided into two types of devices. For example, a first type of device may be hot-plugged into a slot of a given bridge node which is created without any resources allocated as part of the hot-plug operation. A second type of device (e.g., second device) may be operably connected to the computer prior to a hot-plug operation. In this case, a rebalance may be performed in an attempt to relocate resources from one or more upper level bridge devices to satisfy resource requirements for a hot-plugged device if the second device does not have enough resources readily available.

In the boot rebalance operation, there may be multiple devices that are not configured or partially configured (e.g., SR-IOV devices) within a PCI fabric that may require resource allocation. It is contemplated that a rebalance operation may occur only once for all devices in the PCI fabric instead of invoking a rebalance operation for each device. It is also contemplated that the rebalance may provide adequate resources without having to reboot the computer again to make such resources available to the devices.

FIG. 1 depicts an apparatus 30 for rebalancing resources during boot up in computer 33 in accordance to one embodiment. The apparatus 30 includes a resource manager 32 and a device tree 34. The resource manager 32 may include, but not limited to, any number of microprocessors, ASICs, ICs, memory devices, and software code that co-act with one another within the computer 33 to perform the various functions described herein. In another example, the resource manager 32 may comprise a computer program product including a computer-readable medium and computer program logic encoded thereon then when executed in the computer 33 performs the various functions described herein.

The device tree 34 includes a root complex 36 (e.g., see device node labeled "1") and a plurality of devices 38 (e.g., see device labeled "2, 3, 4, 5, 6, 7, 8, 9, 10, 11, 12, 13, 14, 15, 16, 17, 18, 19, 20, 21, 22, etc."). The root complex may be referred to hereafter as either 36 or 1. The device 38 may be referred to hereafter as any one or more of 2, 3, 4, 5, 6, 7, 8, 9, 10, 11, 12, 13, 14, 15, 16, 17, 18, 19, 20, 21, 22, etc. For purposes of description, the root complex 36 and the devices 38 may described by way of familial relationships. For example, root complex 36 (or 1) may be (i) a parent to devices 38 (or 2 and 3), (ii) a grandparent to devices 38 (or 4, 5, 6, 7, and 8) and a (iii) a great grandparent to device 38 (10, . . . , 21). The relevance of the relationships of the nodes with respect to one another will be described in more detail below. The root complex 36 is generally defined as a device that does not include a parent or other elder node located directly above it. It is recognized that any number of root complexes 36 may be included within the device tree 34.

The root complex 36 and the devices 38 are operably coupled to one another via a bus system 40. The bus system 40 enables communication between a central processing system (CPU) (not shown) in the computer 33 and the devices 28 in the device tree 34. In one example, the bus system 40 may be implemented as a PCI bus or other suitable variant thereof.

The device 36 and/or 38 may be received at connection or interface points in the computer 33 and may comprise various ICs (or other planar devices) or other hardware generally fitted on a motherboard of the computer system 33 such as expansion cards. The device nodes 36 and/or 38 may also comprise a bridge (or switch) or an endpoint (such as, but not limited to, network cards, storage devices, universal serial bus (USB) adapters, etc.).

A PCI controller (not shown) operates with the PCI bus 40 to enable communication and/or data exchange between the devices 36 and/or 38 and the CPU. It is known that the PCI bus 40 may be operably coupled to non-PCI buses within the computer 33. Such non-PCI buses and their corresponding adapters may be defined as leaf devices. Examples of leaf devices may include, but not limited to, a USB bus adapter, an Industry Standard Architecture (ISA) bus adapter, a Cardbus adapter, and an Express Card adapter.

The resource manager 32 coacts with the device tree 34 to (i) identify relocatable and non-relocatable resources (e.g., PCI bus numbers, PCI input/output (I/O), and/or memory addresses) belonging to one or more of the device 36 and/or 38 during the boot operation, (ii) provide an adequate amount of resources to the devices 36 and/or 38 in the event one or more of such devices 36 and/or 38 are found not to have an adequate amount of resources, and/or (iii) provide an adequate amount of resources for any new requirements provided in later issued PCI specifications. A boot operation is generally defined as the process of starting or resetting the computer system 33. For example, the boot operation may include the system 33 executing software to load and start the OS such that the OS is prepared for use.

In general, the notion of (i) identifying relocatable and non-relocatable resources for one or more of the device 36 and/or 38; (ii) providing an adequate of amount of resources for the device 36 and/or 38; or (iii) providing new requirements specified in the PCI specification during a boot up in the computer 33 may be generally defined as a boot rebalance.

With regard to the boot rebalance, the resource manager 32 identifies all of the root complexes 36 in the device tree 34 at computer 33 boot up, and for all of the device nodes 38 that are located underneath each respective root complex 36. The resource manager 32 may also identify which device(s) 38 do not have a proper amount of resources that are allocated thereto. The resource manager 32 determines which device(s) 38 require such additional resources and locates a lowest common parent device to the device(s) that require the additional resources. The devices under the lowest common parent device is generally defined as at least one child device. The lowest common parent device and the at least one child device form a lowest common subtree. The resource manager determines a resource range for the lowest common subtree. The resource range is generally defined as a list of resources that are made available to the lowest common subtree. The resource manager 32 may compare and merge various relocatable resource requests and/or fixed resource requests as requested by the at least one child device to generate a resource requirement for the lowest common subtree.

The resource manager 32 compares the resource range and the resource requirement for the lowest common subtree to the resource range to determine if the resource range includes an adequate amount of resources that can be assigned to the lowest common subtree as indicated in the resource requirement. If the resource range includes an adequate amount of resources that can be assigned to the lowest common subtree (e.g., the resource requirement (range of requested addresses) for the lowest common subtree is capable of being fit into the range of addresses as indicated in the resource range), then a rebalance operation may occur during computer 33 boot up in the manner indicated in the resource requirement. If the resource range does not include an adequate number of resources that can be assigned to the lowest common subtree, then resource manager 32 locates a next lowest common parent device and calculates a new resource range for the next lowest common subtree and a new resource requirement for the next lowest common subtree. Each device 36 or 38 may be probed and programmed by a PCI configurator (or caller) to include the desired or needed resources. The PCI configurator is generally defined as logic within the OS, which enables communication with the resource manager 32 or other suitable interfaces within the computer 33

Figure 2:
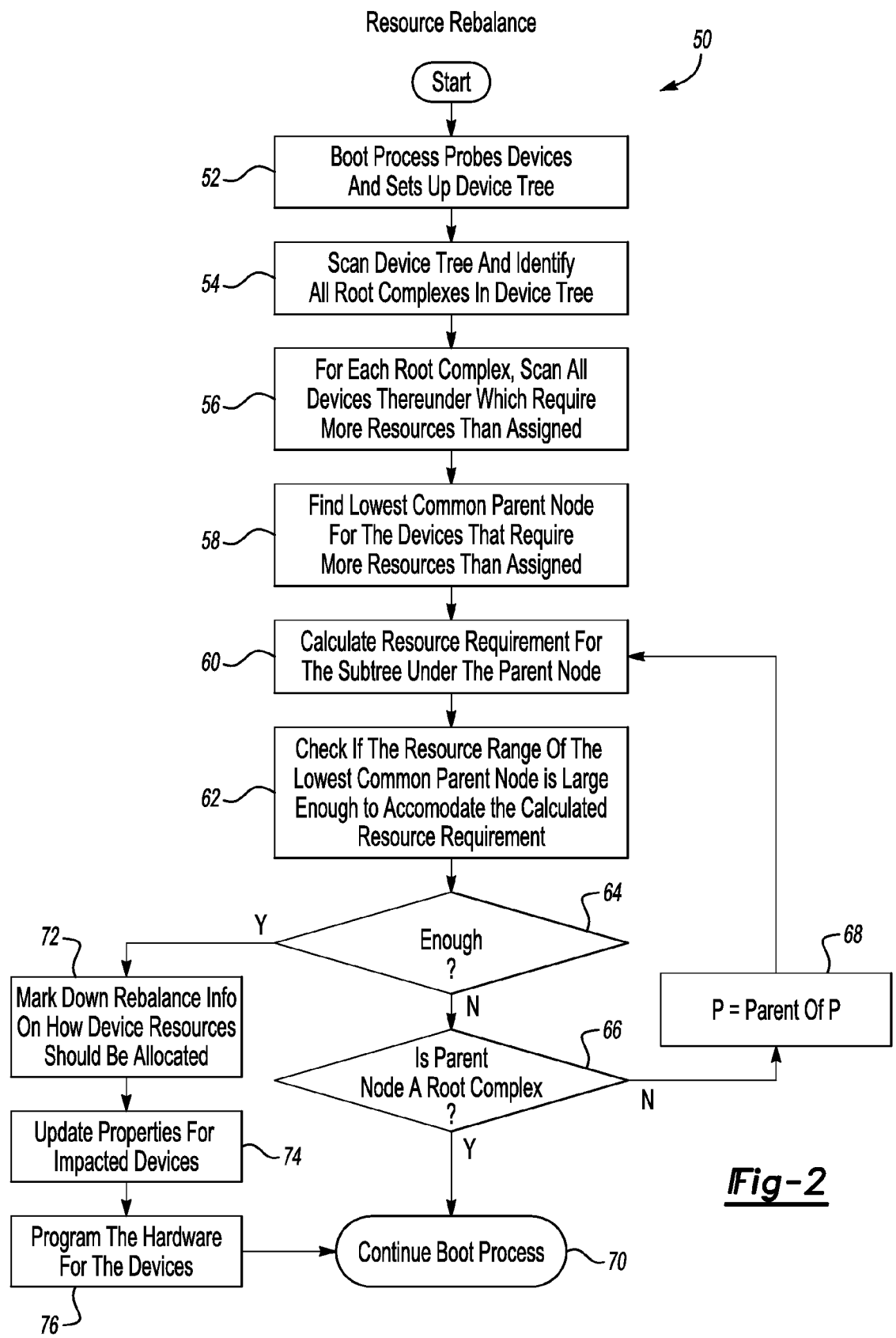
FIG. 2 depicts a method for rebalancing resources during computer system boot-up in accordance to one embodiment.

FIG. 2 depicts a method 50 for rebalancing resources during system 33 boot-up in accordance to one embodiment. The particular order of the operations in the method 50, when executed, may be in any order and are not intended to be limited to only being performed sequentially. The order of the operations may be modified or varied based on the desired criteria of a particular implementation.

In operation 52, the resource manager 32 probes the various devices 36 and 38 and sets up the device tree 34 in response to the computer 33 executing a boot operation.

In operation 54, the resource manager 32 scans the device tree 34 and identifies all devices 36 (or root complexes) therein.

In operation 56, the resource manager 32 scans each device 38 that is located below each root complex 36 found in operation 54 to determine which of the devices 36 or 38 require more resources than those already assigned. In general, each device 38 includes properties which indicate the types of resources that are used by such a device 38. As noted above, the resources may include, but not limited to, available bus numbers, I/O addresses, memory addresses, and/or prefetchable memory addresses. Each device 38 may need the resources to operate in desired manner.

During the boot operation, the resource manager 32 receives the desired resource requirements from all of the devices 38 for each root complex 36. In the event a particular device node 38 requires a particular group of addresses, the resource manager 32 may calculate such addresses or determine the availability of such addresses based on alignment, base, length, or other suitable information that is read or received from the properties for each device 38.

In operation 58, the resource manager 32 locates the lowest common parent devices 38 (e.g., see devices labeled 4, 5, 6, 7, 8, 9, etc.) within the device tree 34 that require more resources than those already assigned thereto. A lowest common subtree generally includes at least one lowest common parent device and one or more child devices located directly thereunder. By locating each lowest common parent device 38 and by calculating the resource requirement for each lowest common subtree, such a condition may enable a single rebalance operation to make resources available to the device(s) 38 in the tree 34.

In operation 60, the resource manager 32 calculates the total amount of resources (or resource requirement) for the lowest common subtree. The calculated resource requirement generally corresponds to various fixed (or non-relocatable) requests and/or non-fixed (e.g., relocatable requests, that are combined and/or merged with one another. This will be discussed in more detail in connection with FIG. 3.

In operation 62, the resource manager 32 establishes a resource range for the lowest common subtree (e.g., the lowest common parent device and its corresponding children). The resource range is generally defined as a total number of resources that are assigned to the lowest common subtree. In one example, the resource range may be in the form of [range_base, range_end], which accommodates all the resources that are assigned or provided to the lowest common subtree.

The resource manager 32 then determines whether the calculated resource requirement for the lowest common subtree fits the resource range for the lowest common subtree.

In operation 64, if the resource manager 32 determines that the resource range of the lowest common subtree is large enough to accommodate the calculated resource requirement, then the method 50 moves to operation 72. If not, then the method 50 moves to operation 66.

In operation 66, the resource manager 32 determines if the lowest common parent device 38 is a root complex 36. If the lowest common parent device 38 is not a root complex 36, then the method 50 moves to operation 68. If the lowest common parent device 38 is a root complex 36, then the method 50 moves to operation 70.

In operation 68, the resource manager 32 moves to the device 38 that is positioned directly above the lowest common parent device 38. In other words, the resource manager 32 moves on to a new common parent device (e.g., see FIG. 1 and devices labeled 2 and 3), which is directly above the lowest common parent device (e.g., devices labeled 4, 5, 6, and 7). The lowest common parent device may now be defined as child device. Operations 60, 62, and 64 are executed again to determine if the new parent device has adequate resources to satisfy the resource requirement. These operations are executed until the root complex 36 for a given subtree is found (e.g., if the condition noted in operation 66 is found to be true).

In operation 70, the resource manager 32 allows the boot process to resume since at this point in the method 50, the new parent device node is detected to be a root complex 36. In the event the resource range is not adequate to provide an adequate amount of resources based on the calculated resource requirement and the next parent device is a root complex, then the rebalance operation fails.

Turning back to the affirmative condition of operation 64 (e.g., method 50 moves from operation 64 to operation 72) in which the resource manager 32 determines that resource range is large enough to satisfy the calculated resource requirement. Such a condition generally illustrates that a rebalance operation may occur and the resources within the resource range may be allocated or provided to the child devices based on the resource requests indicated within the calculated resource requirement. In operation 72, the resource manager 32 stores data corresponding to the manner in which the resources may be reallocated during re-balance.

In operation 74, the resource manager 32 communicates with the OS such that the properties for the impacted devices 38 are updated. For example, in the event one or more of the devices 38 are providing resources or are receiving resources, the properties for each affected device 38 may be updated to reflect that (i) such resources are no longer associated with the particular device 38 or (ii) resources will be provided to such devices 38 in the event they are needed for the particular device 38 to operate in the manner intended. It is recognized that the affected devices 38 may have their respective operation(s) suspended prior to the properties being updated (e.g., suspended prior to the runtime balance being performed). Such a condition enables the updated properties to take effect for the most recent boot operation. This condition may prevent the need to reboot the computer 33 in order for the updated properties to take effect for the affected devices 38.

In operation 76, the resource manager 32 returns the resource information (e.g., base and length) to the PCI configurator. The PCI configurator programs registers for each affected device 38 such that newly assigned resources are provided thereto.

In general, after the resource manager 32 determines that the calculated resource requirement can fit into the resource range (see operation 64), the resource manager 32 may use the range base address as the base address for the lowest common subtree (or impacted subtree), and recursively move down the device tree 34 relocating relocate requests from top to bottom, level by level. The properties for the devices 38 are changed during this time to reflect the current resources each device 38 now occupies. The resource manager 32 scans the impacted device tree again and programs each device 38 therein accordingly.

Figure 3:
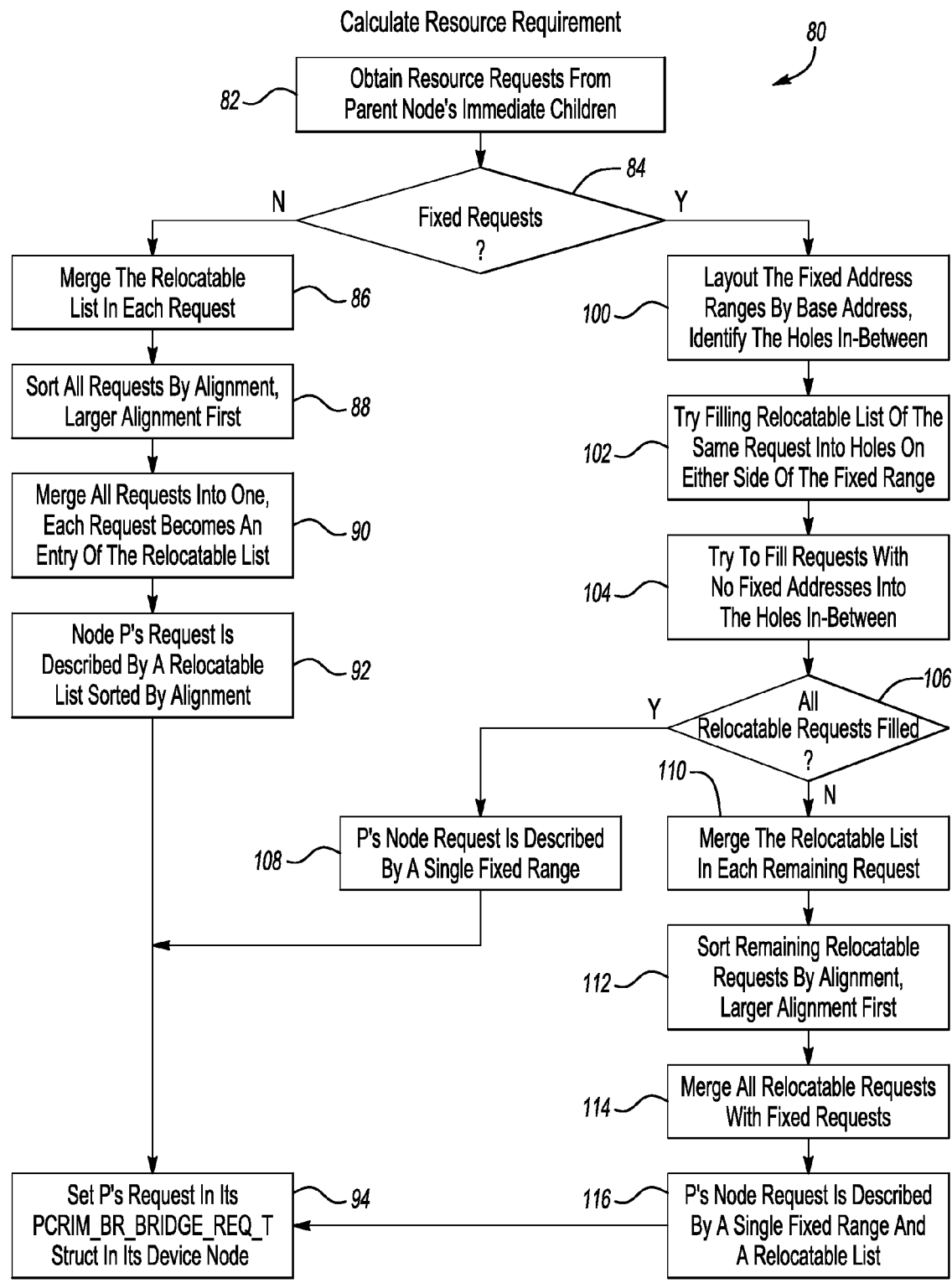
FIG. 3 depicts a method for determining resource requirements for a parent device node in accordance to one embodiment.

FIG. 3 depicts various operations 80 that are executed in connection with the operation 60 of the method 50 for calculating resource requirements in accordance to one embodiment. The particular order of the operations 80, when executed, may be in any order and are not intended to be limited to only being performed sequentially. The order of the operations may be modified or varied based on the desired criteria of a particular implementation.

Figure 4:
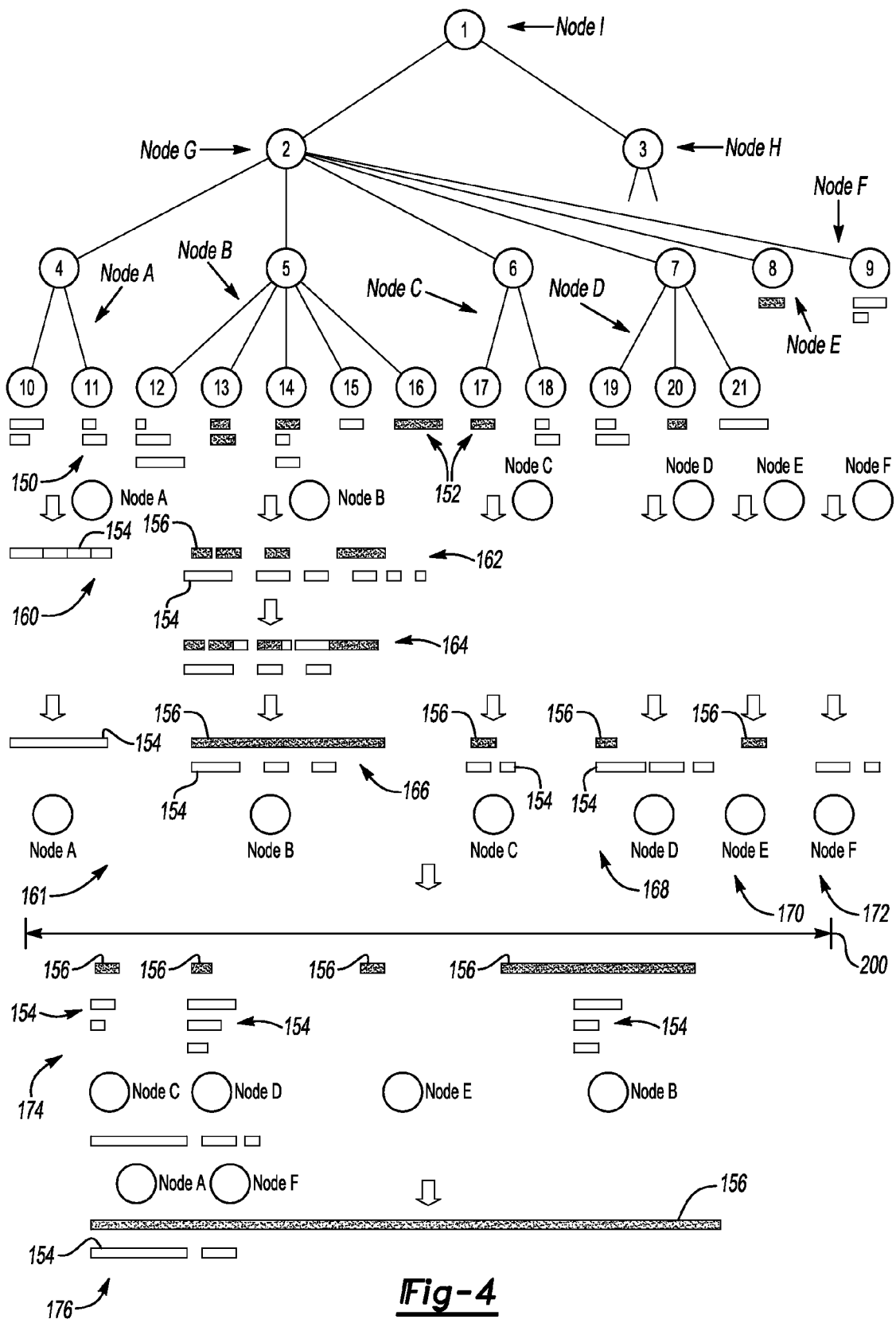
FIG. 4 depicts an example of the manner in which a rebalance operation may occur in the computer.

In operation 82, the resource manager 32 obtains resource requests from each immediate child device for every lowest common parent device 38 (e.g. this operation occurs during the boot operation). Nodes A, B, and E as shown in FIG. 4 will be referenced for purposes of describing FIG. 3.

In operation 84, the resource manager 32 determines whether the resource requests from each immediate child device for the nodes are relocatable or fixed. For example, the resource manager 32 determines whether the various bus numbers and memory addresses (e.g., resources) can be assigned or reassigned to various devices that reside in different locations within the computer 33. A relocatable resource is generally defined as an item (e.g., bus numbers, memory addresses, etc.) that may be assigned to any device that resides in one or more different locations within the computer 33. A fixed resource (or non-relocatable resource) is generally defined as an item (e.g., bus numbers, memory addresses, etc.) that can only be assigned to a particular device that resides in a particular location within the computer 33.

In the event the resource manager 32 determines that none of the children devices for any one of the nodes requested a fixed resource, then the method 80 moves to operation 86. In the event the resource manager 32 determines that any requests made by any one of the nodes are fixed, then the method 80 moves to operation 100 to execute for that particular node. FIG. 4 illustrates that node A only includes relocatable requests 150 as depicted by the empty shading of the various blocks of addresses; node B includes both relocatable resource requests and non-relocatable resource requests 152 (as indicated by the shaded blocks of address); and node E includes only non-relocatable resource requests 152. As noted above, since node A includes only relocatable requests 150, the method 80 moves to operation 86 for node A. Nodes B and E include fixed requests 152. As such, the method 80 moves to operation 100 for nodes B and E.

In operation 86, the resource manager 32 merges the requested relocatable resources such that a single range of relocatable resources is formed for node A.

In operation 88, the resource manager 32 sorts the merged relocatable resources by larger alignment first for node A.

In operation 90, the resource manager 32 merges all of the requested relocatable resources for node A into one.

In operation 92, the resource manager 32 describes the requested relocatable resources for node A into a relocatable list. It is recognized that in the event any additional nodes other than node A includes only relocatable requests, then operations 86, 88, 90 and 92 will be executed for each of such nodes in addition to node A.

The following data structure represents one example of a relocatable list for given node:

```
/* Relocatable resources */
typedef struct pcirm_size_list {
        dev_info_t      *dip;           /* Device where this address
                                           exist */
        int             bar_off;        /* BAR offset */
        uint64_t        size;           /* Size of this relocatable
                                           resource */
        uint64_t        align;          /* Alignment requirement */
        struct pcirm_size-list *next;   /* Next piece of relocatable
                                           resource */
} pcirm_size_list_t;
```

In operation 100, the resource manager 32 lays out the fixed address ranges by base address and identifies any holes or gaps in address ranges for the fixed range for each affected node.

In operation 102, the resource manager 32 attempts to fill the various holes of address ranges as defined in operation 100 with relocatable resources on either side of the fixed address ranges for node B (of each affected node). Operation 102 may not apply to node E since node E does not include relocatable resources.

In operation 104, the resource manager 32 attempts to fill the various holes of address ranges as defined in operation 102 with non-fixed addresses into the holes in-between for node B.

In operation 106, the resource manager 32 determines whether the various holes of address ranges have been filled with the requested relocatable resources for each affected node. If this condition is true, then the method 80 moves to operation 108. If this condition is not true, then the method 100 moves to operation 110.

In operation 108, the resource manager 32 provides the requested resources in a single fixed range for the affected node. As noted above, node E only includes fixed resources. As such, when operation 108 is executed in connection node E, node E's resource request may be described by a single fixed range. An example of a data structure that may correspond to such a single fixed range can be found directly below:

```
/* Fixed resources */
typedef struct pcirm_addr_list {
        dev_info_t      *dip;           /* Device where this address
                                           exist */
        int             bar_off;        /* BAR offset */
        uint64_t        base;
        uint_64_t       end;
        struct pcirm_addr_list *next;   /* Next piece of fixed resource */
} pcirm_addr_list_t;
```

In operation 110, the resource manager 32 merges the relocatable requested resources to form a relocatable list.

In operation 112, the resource manager 32 sorts remaining requested relocatable resources in the relocatable list by alignment. Larger alignment is arranged first.

In operation 114, the resource manager 32 merges all requested relocatable resources with the requested fixed requests as formed in operation 104 for node B.

In operation 116, the resource manager 32 describes the resource request for node B by a single fixed range and a separate relocatable list.

In operation 94, the resource manager 32 obtains the particular node's request in PCRIM_BR_BRIDGE_REQ_T. As noted above, node B includes both fixed resources and relocatable resources. As such, when operation 116 is executed in connection with node B, node B's resource request may be described by a single fixed range of resource requests and a relocatable list of resource requests. A structure pcirm_bridge_req_t is introduced to represent the resource request of a bridge node for a given type. It is composed of a list of relocatable resource requests and a list of fixed requests from its children. The relocatable list is sorted with requests with a larger alignment placed at the front of the list. The fixed list is sorted by addresses with ascending order. The relocatable requests may be placed around the fixed addresses in the same pcirm_bridge_req_t as they all fall within the bridge's address range.

An example of the contents of PCRIM_BR_BRIDGE_REQ_T is shown directly below:

```
* The resource requirement on a bridge node */
typedef struct pcirm_bridge_req {
        dev_info_t      *dip;   /* The current node
                                   with resource ranges */
        pcirm_type_t type;      /* resource type */
        /*
        * Sorted list of relocatable resources; larger alignment first.
        * If there are non-relocatable addresses (fixed_list !=NULL), the
        * relocatable addresses must be put closely around the
        * non-relocatable addresses.
        */
        pcirm_size_list_t *relo_list;
        /* Sorted non-relocatable addresses, lower address first */
        pcirm_addr_list_t *fixed_list;
        struct pcirm_bridge_req *next;
} pcirm_bridge_req_t;
```

FIG. 4 depicts an example of the manner in which a rebalance operation may occur in the computer 33. In this example, assume that devices 12, 17 and 18 are SR-IOV based devices that require resource allocation. In this case, the lowest common parent device is identified as node G or device 2 and it will be necessary to calculate the resource requirement for device 2 (or node G). Prior to determining the resource requirement for node G, it is necessary to calculate the resource requirement for nodes A, B, C, D, E and F. The lowest common subtree generally includes devices 2, 4, 5, 6, 7, 8, 9, 10, 11, 12, 13, 14, 15, 16, 17, 18, 19, 20, and 21.

For node A, and as discussed above in connection with FIG. 3, its children devices 10, 11 require relocatable requests. As such, these relocatable requests are sorted by alignment and then merged into a single relocatable range (or list) 154 as generally shown at 160 (e.g., largest alignment first). This single relocatable range becomes the calculated resource requirement for node A. The single relocatable range is generally shown at state 161.

Node B's children devices (e.g., 12, 13, 14, 15, and 16) includes both relocatable 150 and non-relocatable (or fixed) requests 152. To calculate the resource requirements for node B, the fixed addresses 152 of node B's children devices are laid out in ascending order to form a fixed list 156 as generally shown at state 162. Likewise the relocatable addresses 150 of node B's children device are laid out in ascending order to form a relocatable list 154 (e.g., by largest alignment first). In state 162, there may be a number of holes in between the addresses in the fixed list 156. All of the children devices of node B may be considered leaf devices.

In state 164, the relocatable requests from the relocatable list 154 may be placed between the fixed requests in the fixed list 156. For example, the relocatable requests are sorted in descending order of alignment (largest first) and the relocatable requests are attempted, by the resource manager 32, to be filled in-between the holes of the fixed requests. It may be preferable to sort the relocatable requests by largest alignment first so that when the larger blocks of relocatable requests are filled in the openings of the fixed list, such a condition may reduce space. Some of the relocatable requests may not be able to fit in-bewteen the holes of the fixed list 156 and may continue to appear in the relocatable list 154 in descending order of alignment. After performing the hole fitting process at state 164, node B's requests may be formed of the single fixed list (or range) 156 and a relocatable list 154 (or list of relocatable ranges) as generally shown at state 166.

For nodes C and D, their respective requests includes a single fixed list 156 and a number of relocatable requests which form the relocatable list 154 as generally shown at state 168. In both nodes C and D the relocatable list is sorted.

Node E includes a single fixed list (or range) 156 as generally shown at state 170 and node F includes a relocataible list 154 (or list of relocatable ranges) as generally shown at state 172. It is recognized that the lowest common parent device (e.g., device 2) of nodes E and F (or devices 8 and 9, respectively) includes fixed resource requests and relocatable resource requests, respectively.

After the resource requests are calculated for the children devices of nodes A, B, C, D, and F, it is necessary to calculate the resource requirement for node G. Nodes A, B, C, and D are bridge nodes (e.g., nodes which include children devices), as such, it is generally necessary to place their corresponding relocatable resource requests adjacent to their corresponding fixed resource requests (node A is an exception as it does not include fixed requests). In this case, the fixed addresses (or resource requests) are laid out. For example, the fixed resources for node C is laid out first since for purposes of this example, it has been designated of having the lowest address (see generally at state 174), then node D, node E, and node B (e.g., node D has the next lowest address and so on for node E and node B). For each of the nodes C, D, E, and B, its corresponding relocatable list 154 is placed under each fixed list 156. For node G, its resource range 200 (e.g., the resource address range for all of the resources that are available to node G) (see operation 62 of FIG. 2) is provided to determine if the calculated resource requirement (e.g., requested resource address range) for the nodes A, B, C, D, E, and F can fit within the resource range 200 for node G. Prior to determining whether the calculated resource requirement for the nodes A, B, C, D, E, and F can fit within the resource range 200, the relocatable resources of the relocatable list 154 are attempted to be placed in holes to the left and to the right of the addresses of the fixed lists 156 for each node.

For example, for node C, the relocatable resources in the relocatable list 154 may be first attempted to be placed to the left of the fixed list 156 and then to the right of the fixed list 156. The range of addresses to the left of the fixed list 156 is generally attempted to be filled first with the relocatable resources. If it is not possible to fill in holes in the fixed list 156 for nodes C, D, E and B, then the process fails. If it is possible to fill in holes to the left and to the right in the fixed list 156 for nodes C, D, E an B, then the final fixed list 156 may be defined as the fixed resource range for node G.

As shown in state 176, the relocatable resources of the relocatable list 154 at state 176 are attempted to be placed to the left and to the right of the fixed list 156. However, in the event the relocatable resources when added to the left and to the right of the fixed list 156 exceeds the range of the resource range 200, such a condition is indicative of node G not being able to satisfy the desired resources needed by the children device under node G and the resource range for node G cannot provide an adequate amount of resources to meet the calculated resource requirement. In this case, the process restarts using the next parent node (e.g., node I) to node G. If however, the relocatable resources when added to the left and to the right of the fixed list 156 is within the range of the resource range 200, such a condition indicates that node G becomes a root node of the subtree under which resources will be shuffled. This condition indicates that the resource range for node 6 is adequate or large enough to provide the desired requests for the device under node G. Once all address relocation information are marked in the device nodes' structures bridges and device hardware may be reprogrammed to reflect the changes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for performing a resource rebalance during a boot operation of a computer, the apparatus comprising:
    a resource manager comprising a processor and memory for being operably coupled to a plurality of devices in a device tree, the resource manager being configured to:
        receive at least one signal indicative of a desired set of requested resources from each of the plurality of devices to enable the plurality of devices to operate in an intended manner;
        determine that at least one first child device of the plurality of devices requires more resources than an amount previously assigned thereto;
        locate a lowest common parent device to the at least one first child device, the lowest common parent device and the at least one first child device forming a lowest common subtree;
        determine a first resource range corresponding to a first available range of resources that are made available to the lowest common subtree;
        calculate a first resource requirement corresponding to a first requested range of resources that includes at least one of a non-relocatable resource request and a relocatable resource request for the lowest common subtree; and
        compare the first resource requirement to the first resource range to determine if the first available range of resources is adequate to satisfy the first requested range of requested-resources,
    wherein the non-relocatable resource request corresponds to a resource request for one or more of bus numbers and memory addresses that can only be assigned to a particular device that resides in a particular location within the computer and wherein the relocatable resource request corresponds to a resource request for one or more of bus numbers and memory addresses that can be assigned to any device that resides in one or more different locations within the computer.

2. The apparatus of claim 1 wherein the resource manager is further configured to enable the resource rebalance in the computer such that the at least one first child device is assigned with an adequate amount of resources if the first available range of resources is greater than the first requested range of resources.

3. The apparatus of claim 1 wherein the resource manager is further configured to determine whether the lowest common parent device is a root complex in response to determining that the first available range of resources is not adequate to satisfy the first requested range of resources, the root complex being defined as a device that does not include another device positioned thereabove in the device tree.

4. The apparatus of claim 3 wherein the resource manager is further configured to locate a first parent device positioned above the lowest common parent device if the lowest common parent device is not a root complex and if the first available range of resources is not adequate to satisfy the first requested range of resources.

5. The apparatus of claim 4 wherein the resource manager is further configured to determine a second resource range corresponding to a third second available range of resources that are made available to the lowest common subtree and to the first parent device and to calculate a second resource requirement corresponding to a second requested range of resources that includes at least one of a first non-relocatable resource request and a first relocatable resource request for the lowest common subtree and the first parent device.

6. The apparatus of claim 5 wherein the resource manager is further configured to compare the second resource requirement to the second resource range to determine if the second available range of resources is adequate to satisfy the second requested range of resources.

7. The apparatus of claim 1 wherein the resource manager is further configured to merge two or more relocatable resource requests to form a relocatable list in the event the lowest common subtree includes the non-relocatable resource request, the relocatable list being sorted by alignment in which the largest alignment is positioned first.

8. The apparatus of claim 1 wherein the resource manager is further configured to layout fixed addresses for the non-relocatable resource request, to identify holes in the fixed addresses, and to fill in the holes of the fixed addresses with one or more first relocatable resource requests.

9. The apparatus of claim 8 wherein the resource manager is further configured to form a single non-relocatable range if the holes in the fixed addresses have been filled with the one or more first relocatable resource requests.

10. The apparatus of claim 8 wherein the resource manager is further configured to form a single non-relocatable range and a single relocatable list if the holes in the fixed addresses cannot be filled with the one or more first relocatable resource requests.

11. A method for performing a resource rebalance during a boot operation of a computer including a plurality of devices in a device tree, the method comprising:
receiving at least one signal indicative of a desired set of requested resources from each of the plurality of devices to enable the plurality of devices to operate in an intended manner;
determining that at least one first child device of the plurality of devices requires more resources than an amount previously assigned thereto;
locating a lowest common parent device to the at least one first child device, the lowest common parent device and the at least one first child device forming a lowest common subtree;
determining a resource range corresponding to a first available range of resources that are made available to the lowest common subtree;
calculating a resource requirement corresponding to a first requested range of resources that includes at least one of a non-relocatable resource request and a relocatable resource request for the lowest common subtree, wherein the non-relocatable resource request corresponds to a resource request for one or more of bus numbers and memory addresses that can only be assigned to a particular device that resides in a particular location within the computer and wherein the relocatable resource request corresponds to a resource request for one or more of bus numbers and memory addresses that can be assigned to any device that resides in one or more different locations within the computer; and
comparing the resource requirement to the resource range to determine if the first available range of resources is adequate to satisfy the first requested range of resources.

12. The method of claim 11 further comprising enabling the resource rebalance in the computer such that the at least one first child device is assigned with an adequate amount of resources if the first available range of resources is greater than the first requested range of resources.

13. The method of claim 11 further comprising determining whether the lowest common parent device is a root complex if the first available range of resources is not adequate to satisfy the first requested range of resources, the root complex being defined as a device that does not include another device positioned thereabove in the device tree.

14. The method of claim 13 further locating a first parent device positioned above the lowest common parent device if the lowest common parent device is not a root complex and if the first available range of resources is not adequate to satisfy the first requested range of resources.

15. An apparatus for performing a resource rebalance during a boot operation of a computer, the apparatus comprising:
a resource manager comprising a processor and memory for being operably coupled to a plurality of peripheral component interface (PCI) devices in a device tree, the resource manager being configured to:
receive at least one signal indicative of a desired set of requested resources from each of the plurality of PCI devices to enable the plurality of PCI devices to operate in an intended manner;
determine that at least one first child device of the plurality of PCI devices requires more resources than an amount previously assigned thereto;
locate a lowest common parent device to the at least one first child device, the lowest common parent device and the at least one first child device defining a lowest common subtree;
determine a resource range corresponding to a first available range of resources that are made available to the lowest common subtree;
calculate a resource requirement corresponding to a first requested range of resources that includes at least one of a non-relocatable resource request and a relocatable resource request for the lowest common subtree;
compare the resource requirement to the resource range to determine if the first available range of resources is adequate to satisfy the first requested range of resources; and
enable the resource rebalance in the computer such that the at least one first child device is assigned with an adequate amount of resources if the first available range of resources is greater than the first requested range of requested-resources,
wherein the non-relocatable resource request corresponds to a resource request for one or more of bus numbers and memory addresses that can only be assigned to a particular device that resides in a particular location within the computer and wherein the relocatable resource request corresponds to a resource request for one or more of bus numbers and memory addresses that can be assigned to any device that resides in one or more different locations within the computer.

* * * * *

UNITED STATES PATENT AND TRADEMARK OFFICE
CERTIFICATE OF CORRECTION

Page 1 of 1

PATENT NO. : 8,621,481 B2
APPLICATION NO. : 13/158669
DATED : December 31, 2013
INVENTOR(S) : Fu et al.

It is certified that error appears in the above-identified patent and that said Letters Patent is hereby corrected as shown below:

In the Specification

In column 6, line 2, delete "33" and insert -- 33. --, therefor.

In column 10, line 48, delete "reloctable" and insert -- relocatable --, therefor.

In column 11, line 9, delete "in-bewteen" and insert -- in-between --, therefor.

In column 11, line 20, delete "relocataible" and insert -- relocatable --, therefor.

In the Claims

In column 12, line 52, in Claim 1, delete "requested-resources," and insert -- resources, --, therefor.

In column 13, line 16, in Claim 5, delete "a third second" and insert -- a second --, therefor.

In column 14, line 62, in Claim 15, delete "requested-resources," and insert -- resources, --, therefor.

Signed and Sealed this
Thirtieth Day of June, 2015

Michelle K. Lee
*Director of the United States Patent and Trademark Office*